US012688970B2

(12) United States Patent
Fujita

(10) Patent No.: US 12,688,970 B2
(45) Date of Patent: Jul. 21, 2026

(54) MULTILAYER CAPACITOR, MULTILAYER CAPACITOR GROUP, AND METHOD FOR MANUFACTURING MULTILAYER CAPACITOR

(71) Applicant: Murata Manufacturing Co., Ltd., Nagaokakyo (JP)

(72) Inventor: Yukihiro Fujita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 187 days.

(21) Appl. No.: 18/093,832

(22) Filed: Jan. 6, 2023

(65) Prior Publication Data

US 2023/0145085 A1     May 11, 2023

Related U.S. Application Data

(63) Continuation of application No. PCT/JP2021/029227, filed on Aug. 5, 2021.

(30) Foreign Application Priority Data

Aug. 28, 2020     (JP) ................................. 2020-144733

(51) Int. Cl.
  *H01G 4/232*     (2006.01)
  *H01G 4/30*     (2006.01)
(52) U.S. Cl.
  CPC ............... *H01G 4/232* (2013.01); *H01G 4/30* (2013.01)

(58) Field of Classification Search
  CPC .......... H01G 4/30; H01G 4/232; H01G 4/228; H01G 4/248; H10G 4/232
  (Continued)

(56) References Cited

U.S. PATENT DOCUMENTS

2006/0092595 A1     5/2006  Hwa Lee et al.
2007/0025057 A1*    2/2007  Togashi ................... H01G 4/30
                                                                                    361/307
  (Continued)

FOREIGN PATENT DOCUMENTS

JP          5769297 U1     4/1982
JP          62108265 U1    7/1987
  (Continued)

OTHER PUBLICATIONS

International Search Report in PCT/JP2021/029227, mailed Oct. 26, 2021, 4 pages.
  (Continued)

*Primary Examiner* — Arun Ramaswamy
(74) *Attorney, Agent, or Firm* — Keating & Bennett, LLP

(57) ABSTRACT

A multilayer capacitor includes a capacitor body including dielectric layers, first and second internal electrodes, and first and second main surfaces, first and second external electrodes on at least one of the first and second main surfaces, first via conductors to electrically connect the first external electrode and the first internal electrodes, and second via conductors to electrically connect the second external electrode and the second internal electrodes, a direction in which the dielectric layer, the first internal electrode, and the second internal electrode are laminated is a height direction of the capacitor body, and a height of the
  (Continued)

capacitor body is about 100%, and a height of the first and second external electrodes is equal to or larger than about 50% with respect to the height of the capacitor body.

19 Claims, 13 Drawing Sheets

(58) Field of Classification Search
USPC .................... 361/301.4, 321.1, 321.3, 306.3
See application file for complete search history.

(56) References Cited

U.S. PATENT DOCUMENTS

| | | | | |
|---|---|---|---|---|
| 2008/0037199 A1* | 2/2008 | Fukudome | ............. | H05K 1/185 |
| | | | | 29/25.42 |
| 2008/0251285 A1* | 10/2008 | Sato | ..................... | H05K 1/0231 |
| | | | | 361/313 |
| 2009/0084596 A1 | 4/2009 | Inoue et al. | | |
| 2010/0300602 A1 | 12/2010 | Ichiyanagi et al. | | |
| 2012/0019978 A1 | 1/2012 | Yoshida | | |
| 2015/0043126 A1 | 2/2015 | Hurwitz et al. | | |
| 2015/0170838 A1 | 6/2015 | Suzuki et al. | | |
| 2016/0128244 A1* | 5/2016 | Sawada | ................ | H01G 4/1227 |
| | | | | 206/714 |
| 2016/0155571 A1 | 6/2016 | Doi et al. | | |
| 2017/0040112 A1 | 2/2017 | Tanaka et al. | | |
| 2017/0194419 A1* | 7/2017 | Lee | ......................... | H01G 4/232 |
| 2019/0295772 A1* | 9/2019 | Shin | ........................ | H10D 1/692 |
| 2019/0304695 A1* | 10/2019 | Kim | ......................... | H01G 4/30 |
| 2022/0359121 A1* | 11/2022 | Masunari | ................. | H01G 2/10 |

FOREIGN PATENT DOCUMENTS

| | | | | |
|---|---|---|---|---|
| JP | 11111766 | A | * | 4/1999 |
| JP | 2003133685 | A | | 5/2003 |
| JP | 2006135333 | A | | 5/2006 |
| JP | 2009081423 | A | | 4/2009 |
| JP | 2009152415 | A | | 7/2009 |
| JP | 2010183024 | A | | 8/2010 |
| JP | 2011014883 | A | | 1/2011 |
| JP | 2012044148 | A | | 3/2012 |
| JP | 2015035570 | A | | 2/2015 |
| JP | 2017037930 | A | | 2/2017 |
| WO | 2013005470 | A1 | | 1/2013 |
| WO | 2014024592 | A1 | | 2/2014 |
| WO | 2015016309 | A1 | | 2/2015 |

OTHER PUBLICATIONS

Written Opinion in PCT/JP2021/029227, mailed Oct. 26, 2021, 4 pages.

* cited by examiner

300

MULTILAYER CAPACITOR, MULTILAYER CAPACITOR GROUP, AND METHOD FOR MANUFACTURING MULTILAYER CAPACITOR

CROSS REFERENCE TO RELATED APPLICATIONS

This application claims the benefit of priority to Japanese Patent Application No. 2020-144733 filed on Aug. 28, 2020 and is a Continuation Application of PCT Application No. PCT/JP2021/029227 filed on Aug. 5, 2021. The entire contents of each application are hereby incorporated herein by reference.

BACKGROUND OF THE INVENTION

1. Field of the Invention

The present invention relates to a multilayer capacitor and a multilayer capacitor group including a plurality of multilayer capacitors bonded to a carrier sheet.

2. Description of the Related Art

Multilayer capacitors obtained by, for example, thickening a route through which a current flows, shortening a route through which a current flows, canceling magnetic fields generated by currents having different polarities with each other, or the like to reduce an equivalent series inductance (ESL) are used in various electronic apparatuses and electronic devices. Japanese Unexamined Patent Application Publication No. 2006-135333 discloses a multilayer capacitor (multilayer capacitor array) with a reduced ESL. FIG. 13 illustrates a multilayer capacitor 1000 disclosed in Japanese Unexamined Patent Application Publication No. 2006-135333.

The multilayer capacitor 1000 includes a capacitor body 104 in which dielectric layers 101, first internal electrodes 102, and second internal electrodes 103 are laminated. First external electrodes 105 and second external electrodes 106 are formed on an upper main surface of the capacitor body 104. The first external electrode 105 is connected to the first internal electrode 102 by using a first via conductor (first conductive via hole) 107. The second external electrode 106 is connected to the second internal electrode 103 by using a second via conductor (second conductive via hole) 108.

In the multilayer capacitor 1000, since a direction of a current flowing through the first via conductor 107 and a direction of a current flowing through the second via conductor 108 are opposite to each other, a magnetic field generated by the current flowing through the first via conductor 107 and a magnetic field generated by the current flowing through the second via conductor 108 cancel each other out, and the ESL is reduced.

A thin-layered multilayer capacitor is buried in resin for use these days. Specifically, a multilayer capacitor such as the multilayer capacitor 1000 disclosed in Japanese Unexamined Patent Application Publication No. 2006-135333 may be used by being embedded in resin such as a resin substrate or a resin structure. In this case, it is necessary to electrically connect an external electrode of the embedded multilayer capacitor to the outside of the resin.

However, in the multilayer capacitor 1000 disclosed in Japanese Unexamined Patent Application Publication No. 2006-135333, as can be seen from FIG. 13, heights (thicknesses) of the first external electrode 105 and the second external electrode 106 are much smaller than a height of the capacitor body 104, and thus, it is not feasible to embed the capacitor body 104 in the resin with only top surfaces of the first external electrode 105 and the second external electrode 106 exposed to the outside.

For this reason, in some cases, after the multilayer capacitor 1000 is completely embedded in the resin, holes are formed from an outer surface of the resin toward the first external electrode 105 and the second external electrode 106 by, for example, laser beam irradiation, and the holes are filled with a conductive substance to electrically connect the first external electrode 105 and the second external electrode 106 to the outside.

However, since the heights of the first external electrode 105 and the second external electrode 106 are extremely small, when the holes are formed by laser beam irradiation from the outer surface of the resin toward the first external electrode 105 and the second external electrode 106, the laser beam may pass through the first external electrode 105 and the second external electrode 106 to reach the first via conductor 107 and the second via conductor 108, and the first via conductor 107 and the second via conductor 108 may be exposed to the outside.

Additionally, as another method, after the multilayer capacitor 1000 is completely embedded in resin, the outer surface of the resin may be polished to expose the top surfaces of the first external electrode 105 and the second external electrode 106 to the outside.

However, even in this method, since the heights of the first external electrode 105 and the second external electrode 106 are extremely small, when the outer surface of the resin is polished, polishing may be performed beyond the first external electrode 105 and the second external electrode 106, and the first via conductor 107 and the second via conductor 108 may be exposed to the outside.

The first via conductor 107 and the second via conductor 108 are likely to be oxidized as compared with the first external electrode 105 and the second external electrode 106. Thus, when the first via conductor 107 and the second via conductor 108 are exposed to the outside due to the laser beam irradiation of the resin or due to polishing of the outer surface of the resin, the multilayer capacitor 1000 may become defective.

SUMMARY OF THE INVENTION

A preferred embodiment of the present invention provides a multilayer capacitor including a capacitor body including a plurality of dielectric layers that are laminated, a plurality of first internal electrodes, and a plurality of second internal electrodes, the capacitor body including a first main surface and a second main surface opposed to each other, a plurality of first external electrodes and a plurality of second external electrodes on at least one of the first main surface and the second main surface, a plurality of first via conductors electrically connecting the first external electrode and the plurality of first internal electrodes, and a plurality of second via conductors electrically connecting the second external electrode and the plurality of second internal electrodes, wherein, when the second internal electrode includes a through hole, and the first via conductor is insulated from the second internal electrode, the first via conductor penetrates through the through hole, when the first internal electrode includes a through hole, and the second via conductor is insulated from the first internal electrode, the second via conductor penetrates through the through hole, and when a direction in which the dielectric layer, the first internal electrode, and the second internal electrode are laminated is defined as a height direction of the capacitor body, and a height of the capacitor body is set to 100%, each of heights of the first external electrode and the second external electrode is equal to or larger than about 50% of the height of the capacitor body.

A method for manufacturing a multilayer capacitor according to a preferred embodiment of the present invention includes preparing a base, forming a conductive layer on an outer surface of the base, preparing a plurality of unfired green sheet multilayer bodies in which a first main surface and a second main surface that are opposed to each other are provided, a conductive paste pattern that forms a first internal electrode and a conductive paste pattern that forms a second internal electrode are formed at an interlayer, a through hole penetrating through the first main surface and the second main surface is filled with a conductive paste that forms a first via conductor, and another through hole penetrating through the first main surface and the second main surface is filled with a conductive paste that forms a second via conductor, attaching the first main surface of the plurality of unfired green sheet multilayer bodies to the conductive layer of the base, producing a plurality of capacitor bodies in which the plurality of unfired green sheet multilayer bodies are formed in a state where the plurality of unfired green sheet multilayer bodies is attached to the conductive layer of the base, and the first internal electrode and the second internal electrode are formed at the interlayer, and a first via conductor electrically connected to the first internal electrode, and a second via conductor electrically connected to the second internal electrode are formed to penetrate through the first main surface and the second main surface, and applying a current into the conductive layer and applying electrolytic plating to the first via conductor and the second via conductor that are exposed from the second main surface of the capacitor body, and forming a first external electrode electrically connected to the first via conductor and a second external electrode electrically connected to the second via conductor, the first external electrode and the second external electrode having heights equal to or larger than about 50% of a height of the capacitor body when the height of the capacitor body is set to 100%.

When multilayer capacitors according to preferred embodiments of the present invention are each embedded in resin, top surfaces of the first external electrode and the second external electrode can be easily exposed to the outside by polishing the outer surface of the resin. In addition, when multilayer capacitors according to preferred embodiments of the present invention are each embedded in resin, a hole extending to the top surface of the first external electrode or the second external electrode from the outer surface of the resin can be successfully formed by laser beam irradiation, or the like.

In addition, methods for manufacturing multilayer capacitors according to preferred embodiments of the present invention are each able to form a multilayer capacitor according to a preferred embodiment of the present invention in which the first external electrode and the second external electrode are formed with good quality can be manufactured with high productivity.

The above and other elements, features, steps, characteristics and advantages of the present invention will become more apparent from the following detailed description of the preferred embodiments with reference to the attached drawings.

4

Figure 3A:
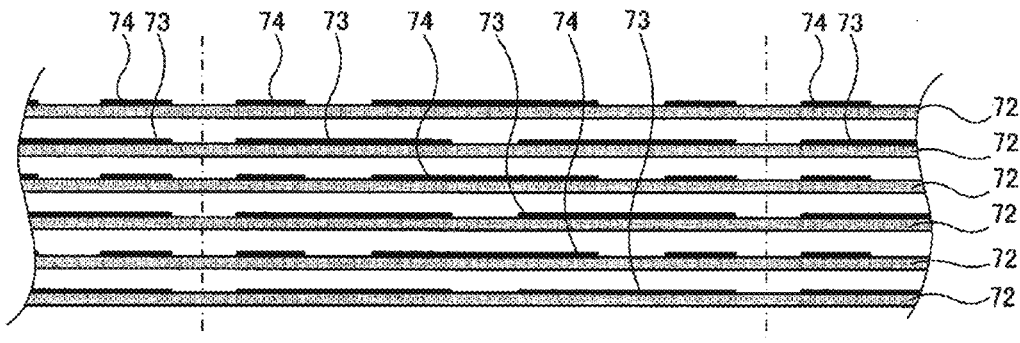
Figure 3B:
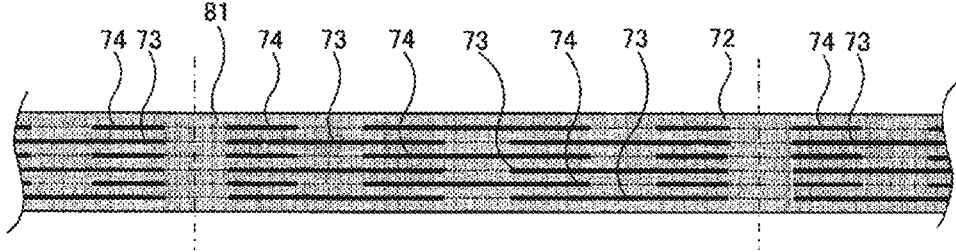
Figure 3C:
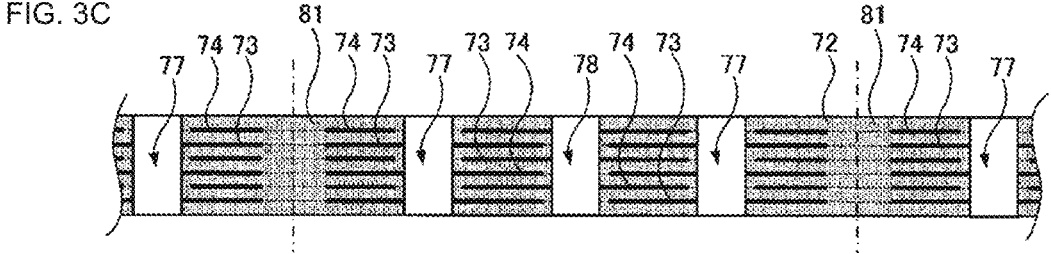

Each of FIGS. 3A to 3C are cross-sectional views illustrating steps that are performed in a method for manufacturing the multilayer capacitor 100 according to a preferred embodiment of the present invention.

FIGS. 4D to 4G are subsequent to FIG. 3C, and are cross-sectional views illustrating the steps that are performed in a method for manufacturing a multilayer capacitor 100 according to a preferred embodiment of the present invention.

Each of FIGS. 5A to 5D are cross-sectional views illustrating forming external electrodes by electrolytic plating in a method for manufacturing a multilayer capacitor 100 according to a preferred embodiment of the present invention.

Figures 6A, 6B, 6C:
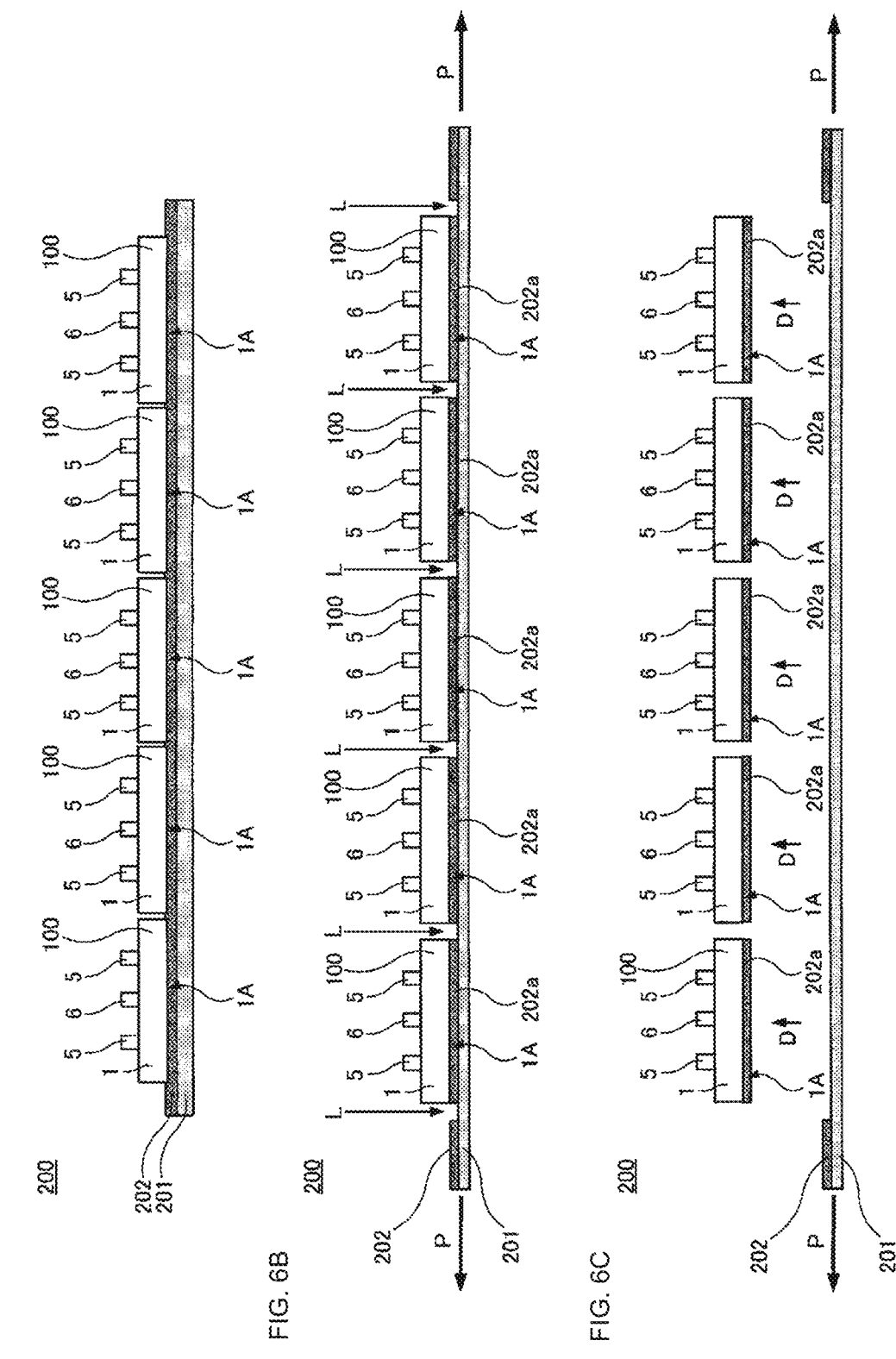

Each of FIGS. 6A to 6C are front views of a multilayer capacitor group 200 according to the first preferred embodiment of the present invention.

Figure 7A:
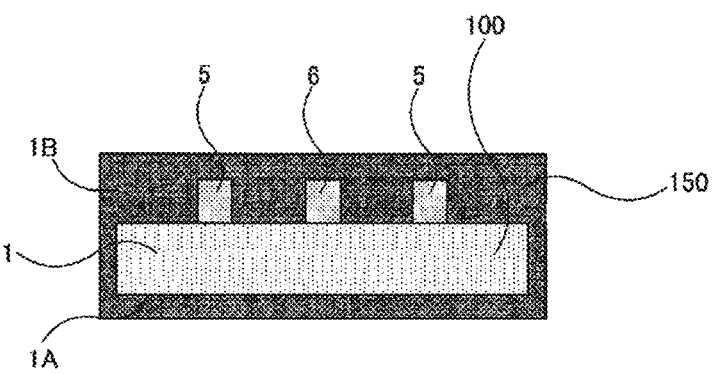
Figure 7B:
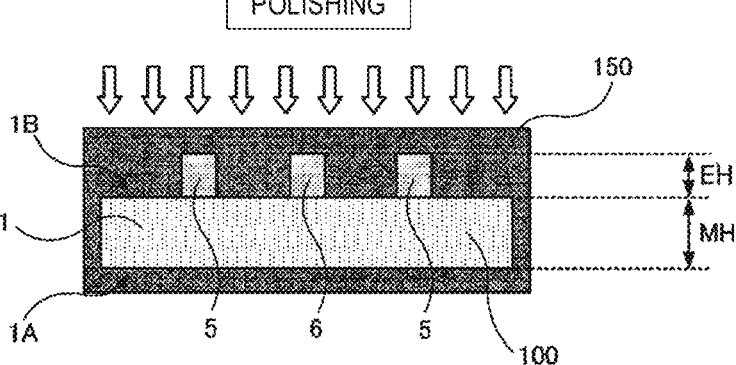
Figure 7C:
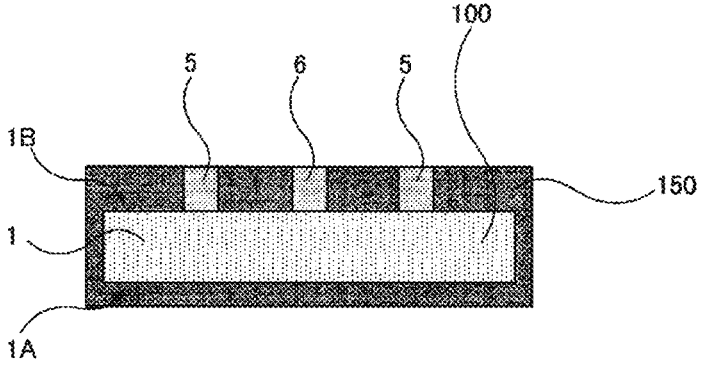

Each of FIGS. 7A to 7C are cross-sectional views (explanatory view) illustrating an example of a method for using the multilayer capacitor 100 according to a preferred embodiment of the present invention.

Figure 8:
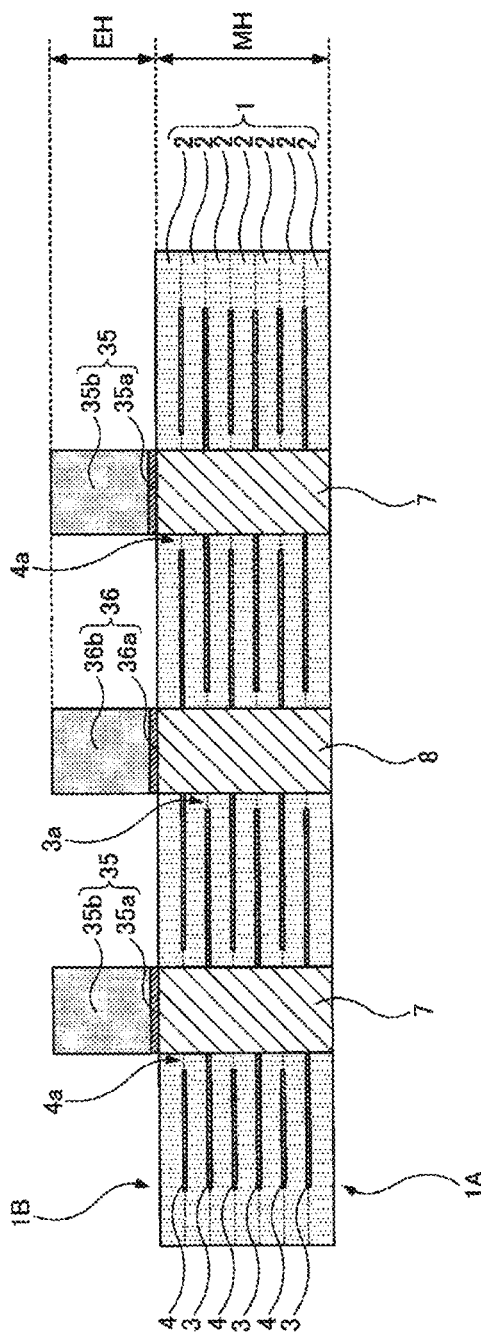

FIG. 8 is a cross-sectional view of a multilayer capacitor 300 according to a second preferred embodiment of the present invention.

Figure 9:
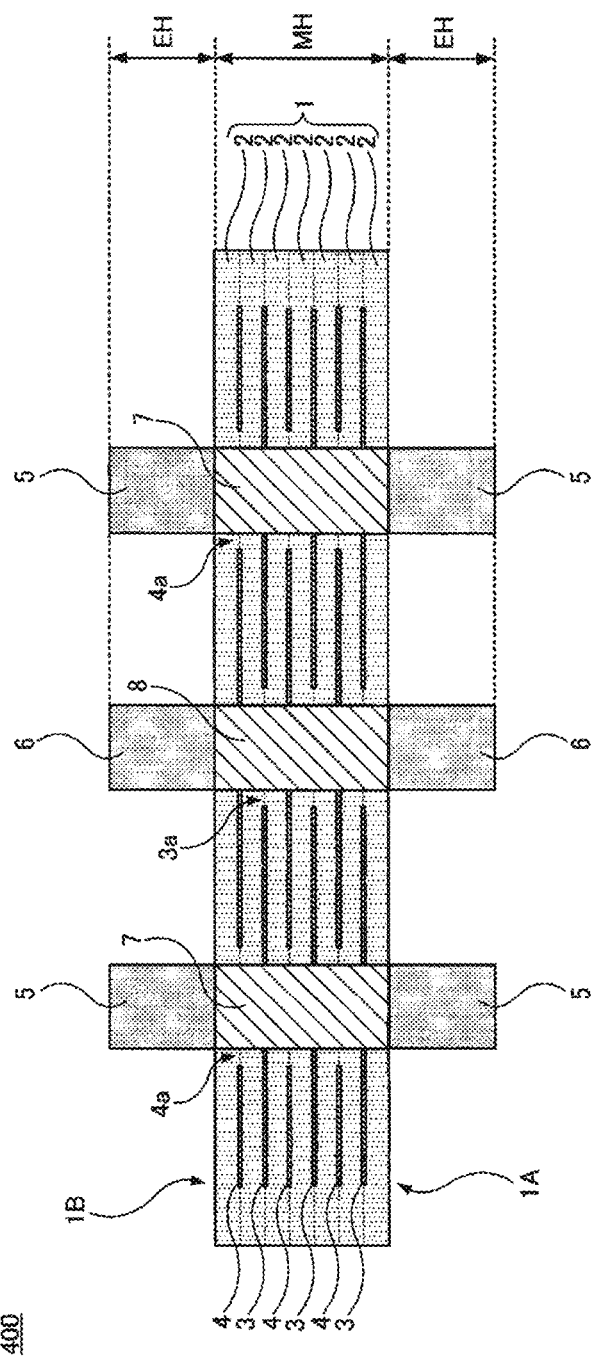

FIG. 9 is a cross-sectional view of a multilayer capacitor 400 according to a third preferred embodiment of the present invention.

Figure 10:
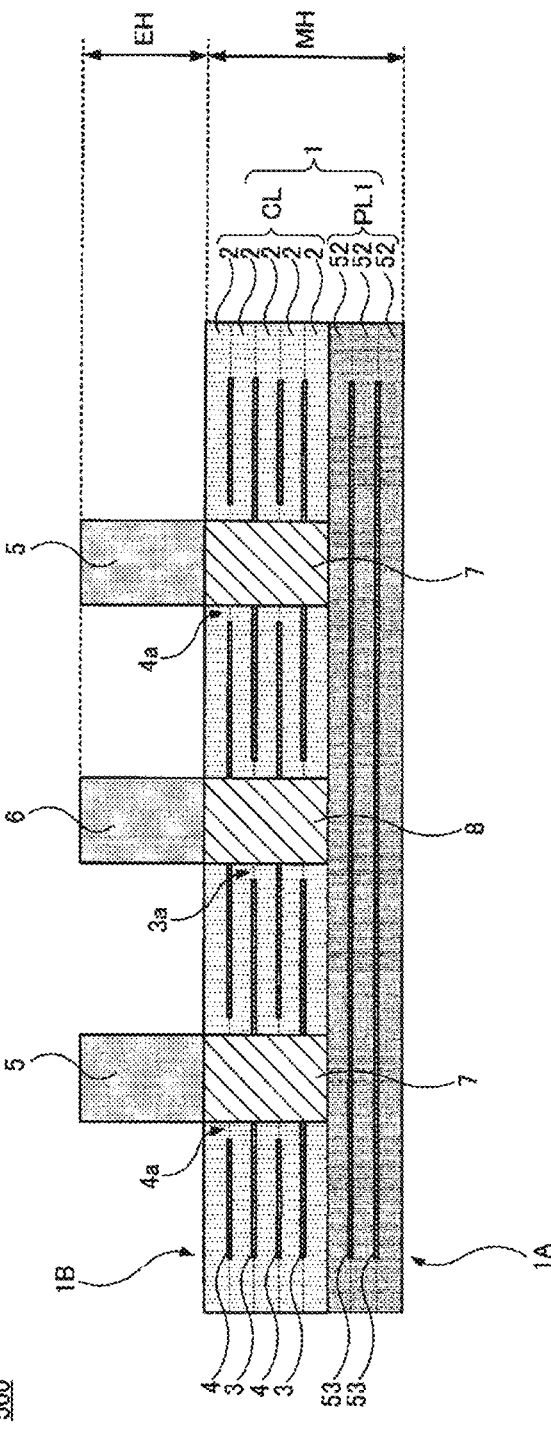

FIG. 10 is a cross-sectional view of a multilayer capacitor 500 according to a fourth preferred embodiment of the present invention.

Figure 11:
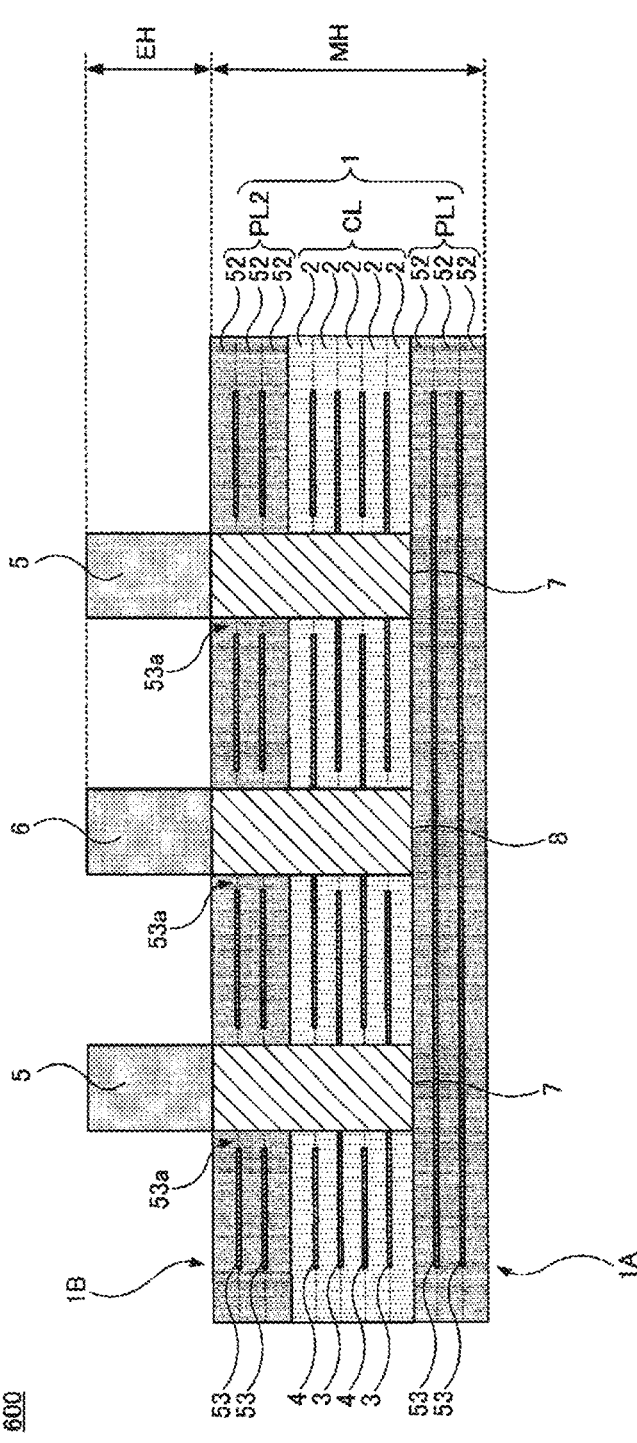

FIG. 11 is a cross-sectional view of a multilayer capacitor 600 according to a fifth preferred embodiment of the present invention.

Figure 12:
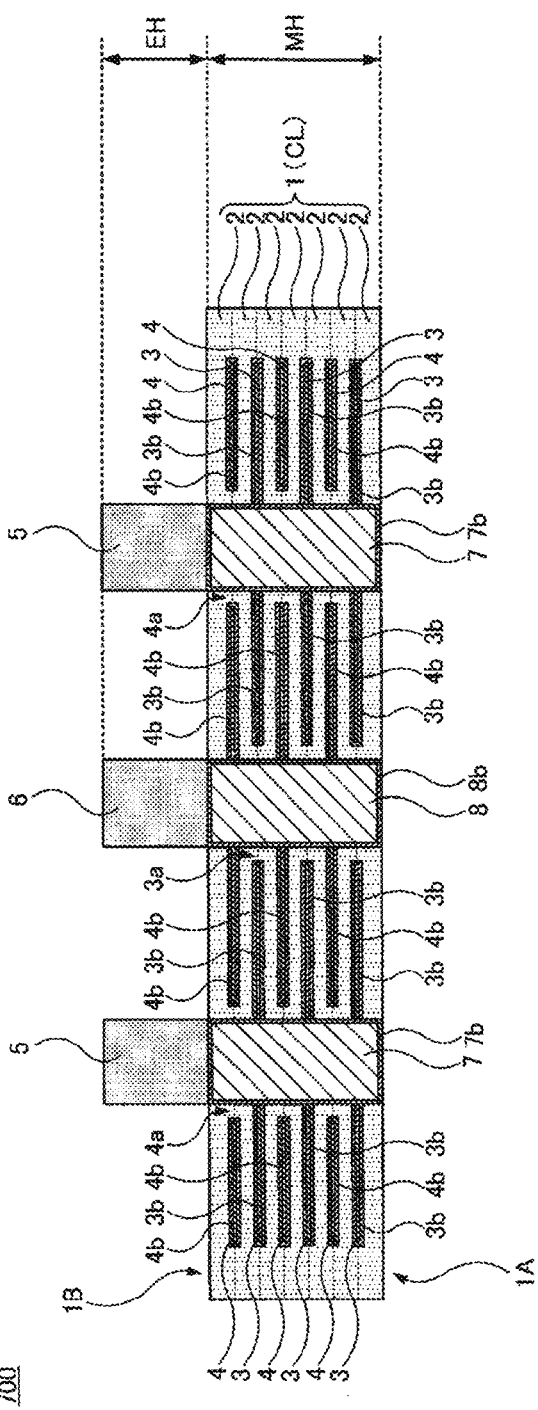

FIG. 12 is a cross-sectional view of a multilayer capacitor 700 according to a sixth preferred embodiment of the present invention.

Figure 13:
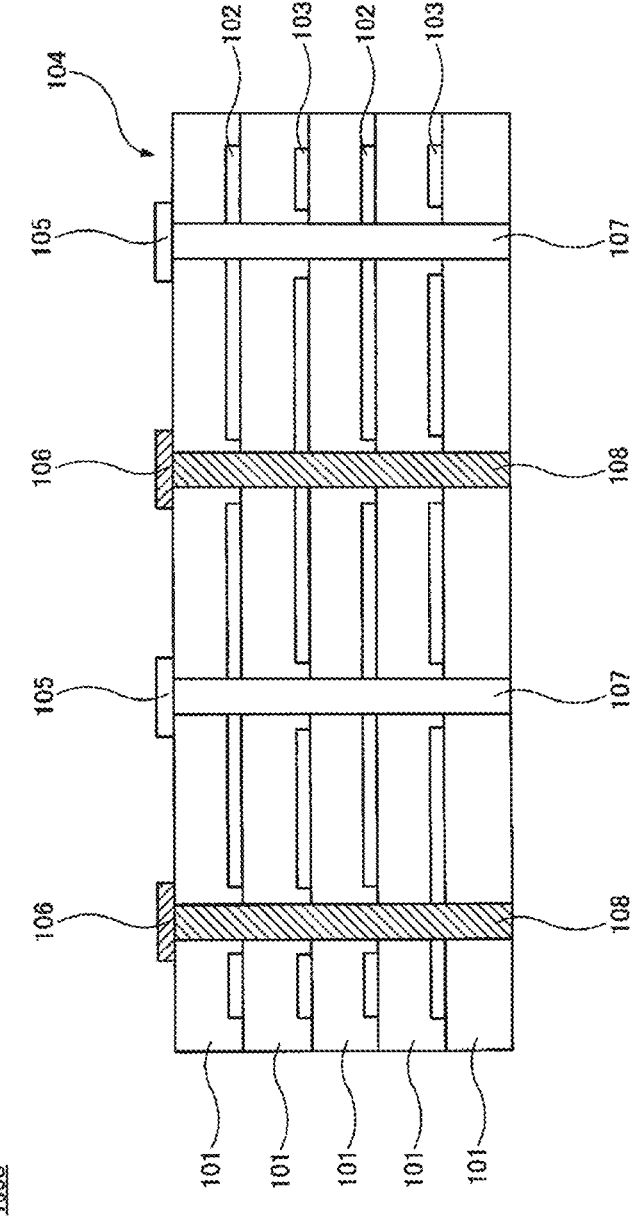

FIG. 13 is a cross-sectional view of a multilayer capacitor 1000 described in Japanese Unexamined Patent Application Publication No. 2006-135333.

DETAILED DESCRIPTION OF THE
PREFERRED EMBODIMENTS

Hereinafter, preferred embodiments of the present invention will be described in detail with reference to the drawings.

Each of the preferred embodiments of the present invention exemplifies an aspect of the present invention, and the present invention is not limited to the elements and features of the preferred embodiments. In addition, the elements and features described in different preferred embodiments can be combined and implemented, and the implemented elements and features in that case are also included in the present invention.

In addition, the drawings are intended to facilitate understanding of the specification, and may be schematically drawn, and a ratio of dimensions of drawn elements or between drawn elements does not necessarily coincide with a ratio of the dimensions described in the specification in some cases. In addition, an element described in the specification may be omitted in the drawings, the number of elements may be omitted, and the like.

First Preferred Embodiment

Multilayer Capacitor

Figure 1:
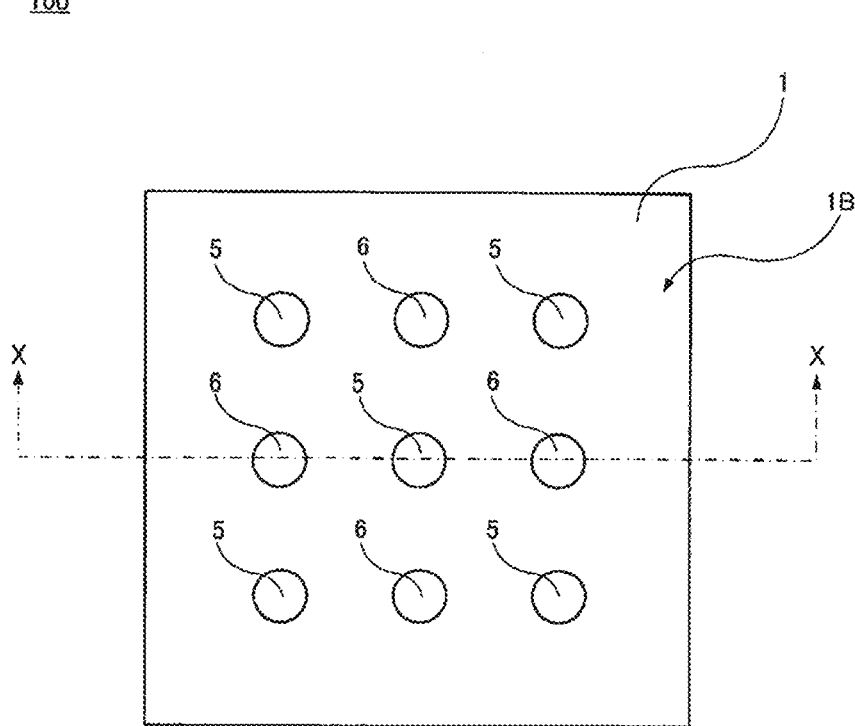
FIG. 1 is a plan view of a multilayer capacitor 100 according to a first preferred embodiment of the present invention.
Figure 2:
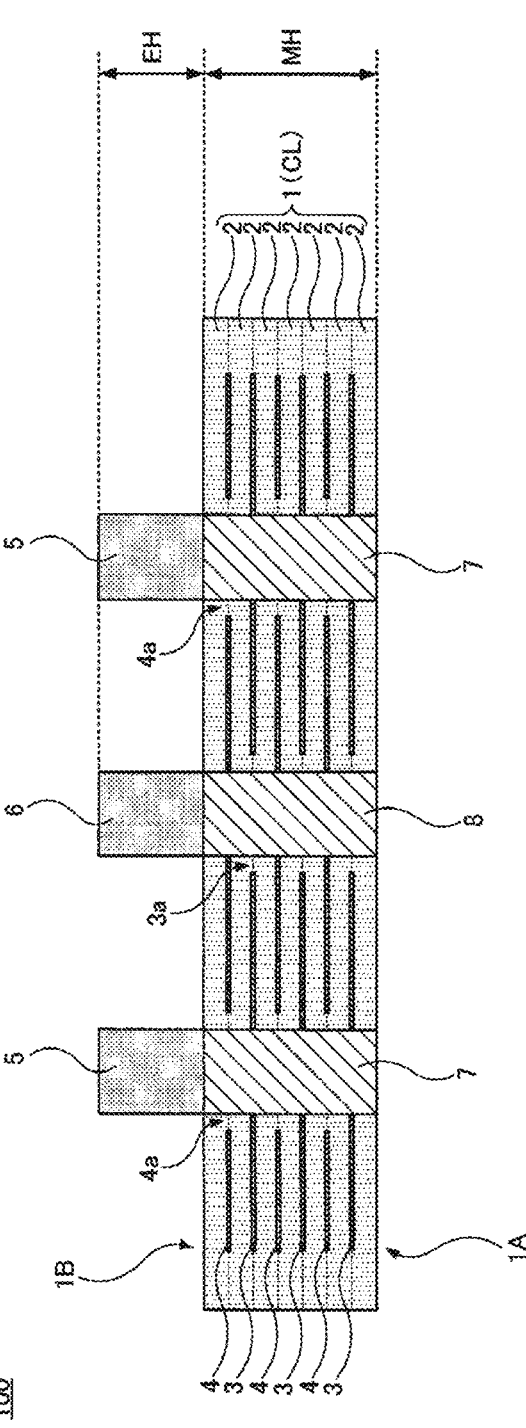
FIG. 2 is a cross-sectional view of the multilayer capacitor 100.

FIG. 1 and FIG. 2 illustrate a multilayer capacitor 100 according to a first preferred embodiment of the present invention. FIG. 1 is a plan view of the multilayer capacitor 100. FIG. 2 is a cross-sectional view of the multilayer capacitor 100, and indicates an X-X portion indicated by a dashed-dotted arrow in FIG. 1.

The multilayer capacitor 100 includes a capacitor body 1 in which a plurality of dielectric layers 2, a plurality of first internal electrodes 3, and a plurality of second internal electrodes 4 are laminated. A portion in which the dielectric layers 2, the first internal electrodes 3, and the second internal electrodes 4 are laminated may be referred to as a capacitance formation region CL of the capacitor body 1.

The capacitor body 1 includes a first main surface 1A defining a mounting surface, and a second main surface 1B opposed to the first main surface 1A at front and back sides and that includes first external electrodes 5 and second external electrodes 6, which will be described later.

In the present preferred embodiment, the dielectric layer 2 is made of ceramic. A composition of the ceramic of the dielectric layer 2 can be freely selected, and for example, a dielectric ceramic including $BaTiO_3$, $CaTiO_3$, $SrTiO_3$, $CaZrO_3$, or the like as a main component can be used.

The capacitor body 1 may have any shape, and may have a rectangular or substantially rectangular shape in a plan view, for example. Additionally, dimensions of the capacitor body 1 can be freely selected, and for example, a dimension in length can be set in a range of about 0.3 mm to about 3.0 mm, a dimension in width can be set in a range of about 0.3 mm to about 3.0 mm, and a dimension in height (thickness) can be set in a range of about 40 μm to about 200 μm. A height of the capacitor body 1 may be thinned in a range of about 40 μm to about 90 μm.

A plurality of through holes 3a are provided in the first internal electrodes 3 in order to allow second via conductors 8, which will be described later, to be inserted therethrough. A plurality of through holes 4a are provided in the second internal electrodes 4 in order to allow first via conductors 7, which will be described later, to be inserted therethrough.

The first internal electrode 3 and the second internal electrode 4 may be made of any material, but in the present preferred embodiment, for example, Ni is used as a main component. However, another metal such as, for example, Cu, Ag, Pd, and Au may be used instead of Ni. Additionally, for example, Ni, Cu, Ag, Pd, Au, or the like may be an alloy with another metal (for example, an Ag—Pd alloy).

A thickness of each of the first internal electrode 3 and the second internal electrode 4 can be freely set, and the thickness can be set, for example, in a range of about 0.3 μm to about 1.0 μm. The number of layers of the first internal electrodes 3 and the second internal electrodes 4 can be freely set. However, the total number of the first internal electrodes 3 and the second internal electrodes 4 can be, for example, from 4 layers to 150 layers. The capacitor body 1 in FIG. 2 is laminated with three first internal electrodes 3 and three second internal electrodes 4, but this is merely an example, and the number of layers for the first internal electrodes 3 and the number of layers for the second internal electrodes 4 are not limited to three.

A plurality of first external electrodes 5 and a plurality of second external electrodes 6 are provided on the second main surface 1B of the capacitor body 1. The plurality of first external electrodes 5 and the plurality of second external electrodes 6 are arranged in rows and columns so as to define a matrix on the second main surface 1B of the capacitor body 1. In the present preferred embodiment, the first external electrodes 5 and the second external electrodes 6 are alternately provided in each of the rows and the columns.

The number of the first external electrodes 5 and the number of the second external electrodes 6 can be freely set, but the numbers can be set from 2 to 300. The number of the first external electrodes 5 and the number of the second external electrodes 6 are preferably the same, but may be different. In FIG. 1 and FIG. 2, five first external electrodes 5 and four second external electrodes 6 are arranged in three rows and three columns, but this is merely an example, and the present invention is not limited to the number and arrangement. For example, eight first external electrodes 5 and eight second external electrodes 6 may be arranged in four rows and four columns. Alternatively, thirteen (twelve) first external electrodes 5 and twelve (thirteen) second external electrodes 6 may be arranged in five rows and five columns.

In the present preferred embodiment, the first external electrode 5 is a plated electrode formed by plating on the first via conductor 7, which will be described later, exposed from the second main surface 1B of the capacitor body 1. Additionally, the second external electrode 6 is a plated electrode formed by plating on the second via conductor 8, which will be described later, exposed from the second main surface 1B of the capacitor body 1. However, the structures, materials, forming methods, and the like of the first external electrode 5 and the second external electrode 6 can be freely selected, and can be designed in various ways.

In the present preferred embodiment, each of the first external electrode 5 and the second external electrode 6 has, for example, a columnar shape. However, the shapes of the first external electrode 5 and the second external electrode 6 can be freely selected, and may be, for example, a truncated cone shape or the like, instead of the columnar shape. In addition, the sizes of the first external electrode 5 and the second external electrode 6 in a surface direction can also be freely set, and can be appropriately set so as to ensure insulation between the first external electrode 5 and the second external electrode 6. The heights (thicknesses) of the first external electrode 5 and the second external electrode 6 will be described later.

In the present preferred embodiment, the first external electrode 5 and the second external electrode 6 are formed by, for example, Cu plating. However, instead of the Cu plating, plating using another type of material such as, for example, Ag, Au, Ni, Pd, or an Ag—Pd alloy may be applicable. Additionally, the plating for forming the first external electrode 5 and the second external electrode 6 may be, for example, electrolytic plating or electroless plating.

The first external electrode 5 and the plurality of first internal electrodes 3 are electrically connected by using the plurality of first via conductors 7. The second external electrode 6 and the plurality of second internal electrodes 4 are electrically connected by using the plurality of second via conductors 8.

The first via conductor 7 penetrates through the through holes 4a in the second internal electrodes 4 while being insulated from the second internal electrodes 4. The second via conductor 8 penetrates through the through holes 3a in the first internal electrodes 3 while being insulated from the first internal electrodes 3.

Materials of the first via conductor 7 and the second via conductor 8 can be freely selected, but in the present preferred embodiment, for example, Ni is used as the main component. However, another metal such as, for example, Cu, Ag, Pd, and Au may be used, instead of Ni. Additionally, for example, Ni, Cu, Ag, Pd, Au, or the like may be an alloy with another metal (for example, an Ag—Pd alloy).

The first via conductor 7 and the second via conductor 8 may have any shape, for example, a columnar shape. Diameters of the first via conductor 7 and the second via conductor 8 can be freely set, and may be set, for example, in a range of about 30 μm to about 150 μm.

Inside the capacitor body 1, a distance between the first via conductor 7 and the second via conductor 8 that are arranged at the closest distance is preferably, for example, equal to or smaller than about 400 μm. This is because a large number of first via conductors 7 and second via conductors 8 can be provided in the capacitor body 1 in this case.

In the multilayer capacitor 100, an electrostatic capacitance is generated between the first internal electrode 3 and the second internal electrode 4. Additionally, the first external electrode 5 and the second external electrode 6 that are electrically connected to an external electronic circuit are electrically connected to the first internal electrodes 3 and the second internal electrodes 4 through the first via conductor 7 and the second via conductor 8, respectively.

The multilayer capacitor 100 has a low ESL because a route through which a current flows includes a large number of first via conductors 7 connected in parallel and a large number of second via conductors 8 connected in parallel, and is configured to be as short as possible. Furthermore, the multilayer capacitor 100 has a low ESL because a magnetic field generated by a current flowing through the first via conductor 7 and a magnetic field generated by a current flowing through the second via conductor 8 cancel each other out.

In the multilayer capacitor 100, when a height MH of the capacitor body 1 illustrated in FIG. 2 is set to 100%, a height EH of the first external electrode 5 and the second external electrode 6 is set to, for example, be equal to or larger than about 50% of the height MH of the capacitor body 1. In the present preferred embodiment, more specifically, the height EH of the first external electrode 5 and the second external electrode 6 is set to, for example, about 50 μm, the height EH of the first external electrode 5 and the second external electrode 6 is set to, for example, about 30 μm, thus setting the height EH of the first external electrode 5 and the second external electrode 6 to, for example, about 60% of the height MH of the capacitor body 1. Thus, in the multilayer capacitor 100, the height EH of the first external electrode 5 and the second external electrode 6 is sufficiently large, and the first via conductor 7 and the second via conductor 8 are less likely to be exposed to the outside even when top surfaces of the first external electrode 5 and the second external electrode 6 are exposed to the outside by polishing an outer surface of resin after being embedded in the resin, or even when holes reaching the top surfaces of the first external electrode 5 and the second external electrode 6 from the outer surface of the resin are formed by laser beam irradiation or the like.

In the multilayer capacitor 100, the reason why when the height MH of the capacitor body 1 is set to 100%, the height EH of the first external electrode 5 and the second external electrode 6 is set to be equal to or larger than about 50% of the height MH of the capacitor body 1 is to make the height EH of the first external electrode 5 and the second external electrode 6 sufficiently large. In a case where the height EH of the first external electrode 5 and the second external electrode 6 is set to about 50% of the height MH of the capacitor body 1, when the height MH of the capacitor body 1 is set to about 200 μm, the height EH of the first external electrode 5 and the second external electrode 6 is about 100 μm. When the height MH of the capacitor body 1 is set to 100 μm, the height EH of the first external electrode 5 and the second external electrode 6 is about 50 μm, for example, which allows the height EH to be sufficiently large. Additionally, for example, even when the height MH of the capacitor body 1 is set to about 40 μm, the height EH of the first external electrode 5 and the second external electrode 6 is about 20 μm, so that the height required to cover and protect the first via conductor 7 and the second via conductor 8 can be ensured.

When the height MH of the capacitor body 1 is set to 100%, the height EH of the first external electrode 5 and the second external electrode 6 is preferably, for example, equal to or larger than about 60% of the height MH of the capacitor body 1. This is because the height EH of the first external electrode 5 and the second external electrode 6 is more sufficiently increased in this case.

Additionally, when the height MH of the capacitor body 1 is set to 100%, the height EH of the first external electrode 5 and the second external electrode 6 is preferably, for example, equal to or smaller than about 80% of the height MH of the capacitor body 1. This is because when the height EH exceeds 80%, the strength of mechanical attachment of the first external electrode 5 and the second external electrode 6 to the capacitor body 1 may become insufficient.

In the multilayer capacitor 100 of the present preferred embodiment, as described above, Ni is used as the main component of each of the first internal electrode 3, the second internal electrode 4, the first via conductor 7, and the second via conductor 8. In the present preferred embodiment, a volume of Ni included in the first internal electrodes 3, the second internal electrodes 4, the first via conductors 7, and the second via conductors 8 is about 28.4 vol % with respect to the total volume of the capacitor body 1. In a case where Ni is used as the main component of each of the first internal electrodes 3, the second internal electrodes 4, the first via conductors 7, and the second via conductors 8, when the volume of Ni included in the first internal electrodes 3, the second internal electrodes 4, the first via conductors 7, and the second via conductors 8 with respect to the total volume of the capacitor body 1 exceeds about 25.0 vol %, the capacitor body 1 has high mechanical strength. In the present preferred embodiment, since the volume of Ni is about 28.4 vol %, the capacitor body 1 has high mechanical strength.

One Example of Method for Manufacturing Multilayer Capacitor

The multilayer capacitor 100 can be manufactured by a method for manufacturing illustrated in FIGS. 3A to 4G, for example. Note that each of FIGS. 3A to 4G are cross-sectional views illustrating a step performed in one example of the method for manufacturing the multilayer capacitor 100.

First, in order to form the dielectric layers 2 of the capacitor body 1, ceramic green sheets are produced. The green sheets are produced as a mother green sheet including a large number of green sheets in order to collectively manufacture a large number of multilayer capacitors 100.

First, although not illustrated, for example, dielectric ceramic powder, binder resin, solvent, and the like are prepared and wet-mixed to produce ceramic slurry.

Next, the ceramic slurry is applied onto a carrier film in the form of a sheet by using, for example, a die coater, a gravure coater, a micro gravure coater, or the like, and dried to produce a mother green sheet 72.

Next, a conductive paste prepared in advance is applied (for example, printed) on main surfaces of the mother green sheets 72 to form conductive paste patterns 73 for forming the first internal electrodes 3 or conductive paste patterns 74 for forming the second internal electrodes 4, the conductive paste patterns 73 and 74 having a desired shape.

Next, as illustrated in FIG. 3A, the plurality of mother green sheets 72 on which the conductive paste patterns 73 are formed and the plurality of mother green sheets 72 on which the conductive paste patterns 74 are formed are arranged in a predetermined order.

Next, as illustrated in FIG. 3B, the plurality of mother green sheets 72 on which the conductive paste patterns 73 are formed and the plurality of mother green sheets 72 on which the conductive paste patterns 74 are formed are pressed and integrated to produce an unfired mother green sheet multilayer body 81.

Next, as illustrated in FIG. 3C, through holes 77 for forming the first via conductors 7 and through holes 78 for forming the second via conductors 8 are formed in the unfired mother green sheet multilayer body 81. The through holes 77 and 78 are formed by, for example, laser beam irradiation.

Figure 4D:
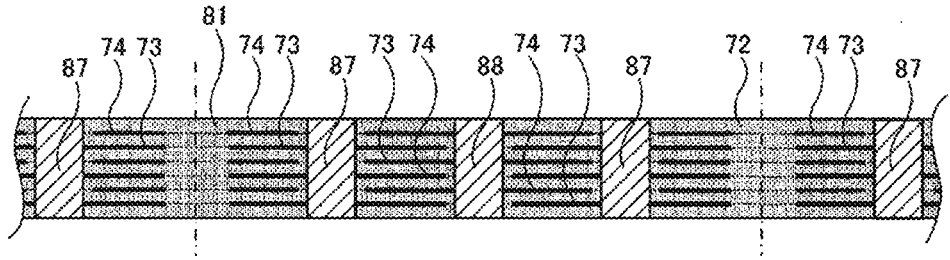

Next, as illustrated in FIG. 4D, the through holes 77 of the unfired mother green sheet multilayer body 81 are filled with a conductive paste 87 for forming the first via conductors 7. The through holes 78 of the unfired mother green sheet multilayer body 81 are filled with a conductive paste 88 for forming the second via conductors 8.

Figure 4E:
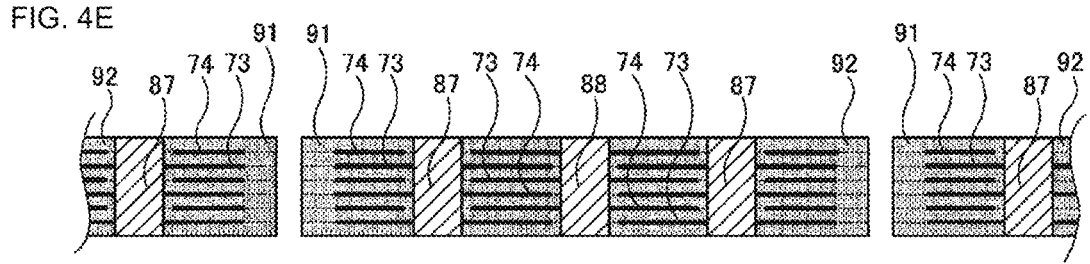

Next, as illustrated in FIG. 4E, the unfired mother green sheet multilayer body 81 is cut into a plurality of unfired green sheet multilayer bodies 91 to be singulated. As a result, the mother green sheet 72 is cut into green sheets 92.

Figure 4F:
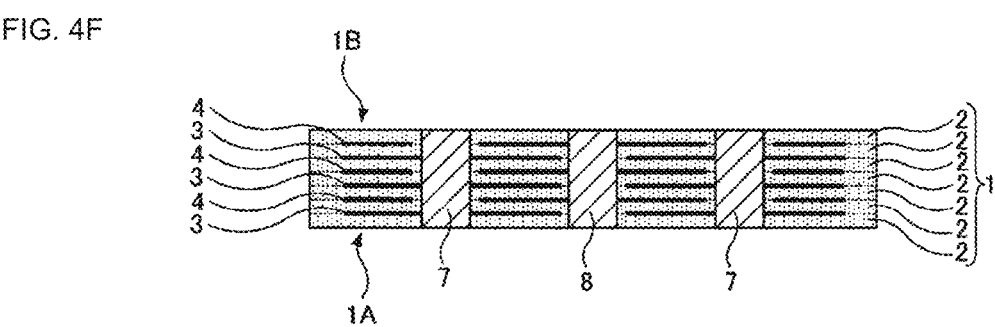

Next, as illustrated in FIG. 4F, the unfired green sheet multilayer body 91 is fired with a predetermined profile. As a result, the unfired green sheet multilayer body 91 is fired to become the capacitor body 1, the green sheets 92 become the dielectric layers 2, the conductive paste patterns 73 become the first internal electrodes 3, the conductive paste patterns 74 become the second internal electrodes 4, the conductive paste 87 becomes the first via conductors 7, and the conductive paste 88 becomes the second via conductors 8.

Figure 4G:
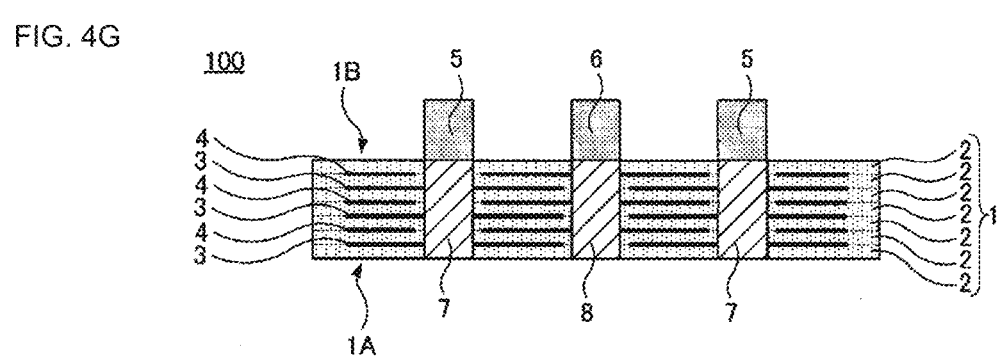

Next, as illustrated in FIG. 4G, plating is performed on the first via conductors 7 and the second via conductors 8 that are exposed from the second main surface 1B of the capacitor body 1 to form the first external electrodes 5 and the second external electrodes 6, thus completing the multilayer capacitor 100 according to the first preferred embodiment. The plating for forming the first external electrodes 5 and the second external electrodes 6 is performed with the first main surface 1A of the capacitor body 1 fixed to a jig, and thus, the first external electrodes 5 and the second external electrodes 6 are not formed on the first main surface 1A of the capacitor body 1. The plating for forming the first external electrodes 5 and the second external electrodes 6 may be electroless plating or electrolytic plating.

Formation of First External Electrodes and Second External Electrodes by Electrolytic Plating In the example of the method for manufacturing the multilayer capacitor 100, the plating for forming the first external electrodes 5 and the second external electrodes 6 may be electroless plating or electrolytic plating, for example. However, the electrolytic plating is preferable because the first external electrodes 5 and the second external electrodes 6 with good quality can be formed in a short time.

FIGS. 5A to 5D illustrate an example of a method of forming the first external electrodes 5 and the second external electrodes 6 by the electrolytic plating.

Figure 5A:
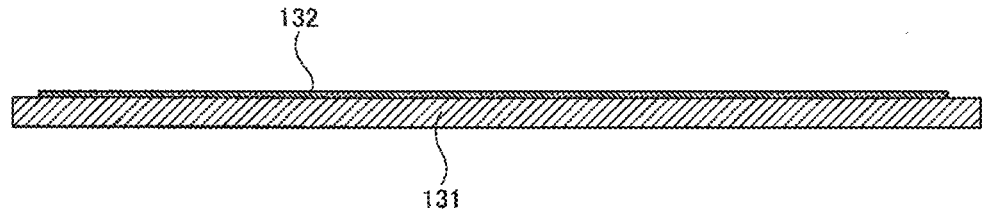

First, as illustrated in FIG. 5A, a base 131 is prepared. The material, shape and the like of the base 131 are freely selected, but in the present preferred embodiment, a ceramic plate including a pair of main surfaces opposed to each other at the front and back sides is used.

Next, as illustrated in FIG. 5A, a conductive layer 132 is formed on at least one main surface of the base 131. The material, state, and the like of the conductive layer 132 are freely selected, but in the present preferred embodiment, a conductive paste is applied on one main surface of the base 131 to form the conductive layer 132. The main material of the conductive paste is freely selected, and one or a plurality of various metals (including alloys) can be used. At this stage, the base 131 may be heated to bake the conductive paste (conductive layer 132) on the base 131. However, in the present preferred embodiment, baking is not performed.

Next, a plurality of unfired green sheet multilayer bodies 91 are prepared. In each unfired green sheet multilayer body 91, the conductive paste patterns 73 for forming the first internal electrodes 3 and the conductive paste patterns 74 for forming the second internal electrodes 4 are formed between the layers, the through holes 77 are filled with the conductive paste 87 for forming the first via conductors 7, and the through holes 78 are filled with the conductive paste 88 for forming the second via conductors 8. Each of the through holes 77 and 78 penetrates between a first main surface 1A and a second main surface 1B of the unfired green sheet multilayer body 91 that are opposed to each other at the front and back sides.

Figure 5B:
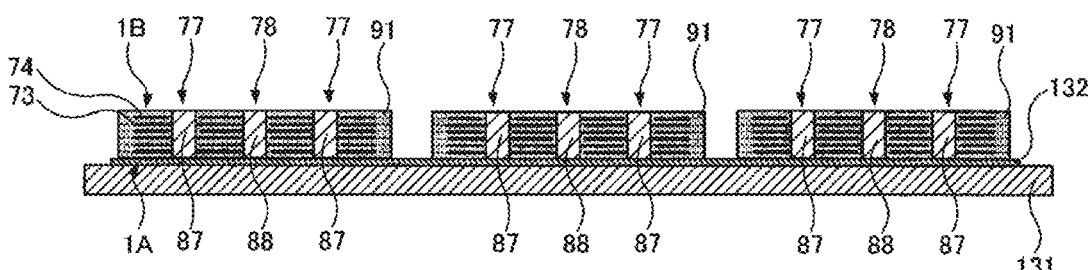

Next, as illustrated in FIG. 5B, the first main surface 1A of each of the plurality of unfired green sheet multilayer bodies 91 is attached to the conductive layer 132 (conductive paste) of the base 131. The unfired green sheet multilayer body 91 may be attached to the conductive layer 132 of the base 131 by a freely selected method. For example, an adhesive force of the unfired green sheet multilayer body 91 or an adhesive force of the conductive layer 132 that is a conductive paste may be used. Alternatively, the unfired green sheet multilayer body 91 may be attached to the conductive layer 132 by using, for example, a conductive adhesive (not illustrated).

Figure 5C:
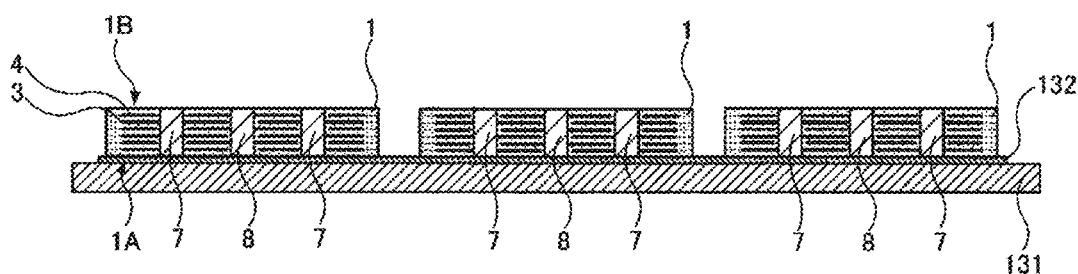

Next, the plurality of unfired green sheet multilayer bodies 91 are fired while being attached to the conductive layer 132 (conductive paste) of the base 131 to obtain the base 131 where the plurality of fired capacitor bodies 1 are attached to the conductive layer 132 as illustrated in FIG. 5C. In the fired capacitor body 1, the first internal electrodes 3 and the second internal electrodes 4 are formed between the layers, and the first via conductors 7 and the second via conductors 8 are formed so as to penetrate between the first main surface and the second main surface. In the present preferred embodiment, at this time, the conductive layer 132 is also fired and becomes a metal film from the conductive paste.

As a result, the conductive layer 132 is electrically connected to the first via conductors 7 and the second via conductors 8.

Figure 5D:
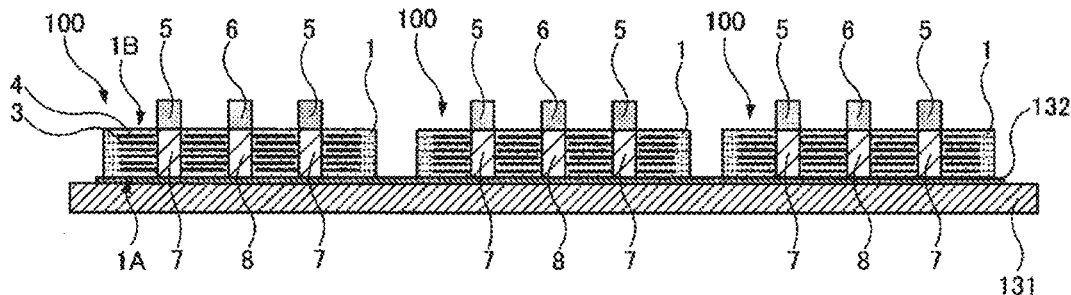

Next, as illustrated in FIG. 5D, a current flows through the conductive layer 132 of the base 131, and electrolytic plating is performed on the first via conductors 7 and the second via conductors 8 that are exposed from the second main surface 1B of the capacitor body 1, thus forming the first external electrodes 5 and the second external electrodes 6.

Finally, the capacitor body 1 where the first external electrodes 5 and the second external electrodes 6 are formed is removed from the conductive layer 132 of the base 131. As described above, the multilayer capacitor 100 is completed.

According to the above-described method, the first external electrodes 5 and the second external electrodes 6 with good quality can be formed to the multilayer capacitor 100 (capacitor body 1) in a short time.

Multilayer Capacitor Group

FIG. 6A illustrates a multilayer capacitor group 200 according to the first preferred embodiment. FIG. 6A is a front view of the multilayer capacitor group 200. In the present disclosure, a multilayer capacitor group refers to an aggregate of a plurality of multilayer capacitors, for example, a plurality of multilayer capacitors bonded to a carrier sheet or the like. The multilayer capacitor group is used, for example, when a plurality of multilayer capacitors are stored or transported for sale or the like.

The multilayer capacitor group 200 includes a carrier sheet 201. The carrier sheet 201 has stretchability in a surface direction. The carrier sheet 201 may be made of a freely selected material, and for example, resin may be used. The carrier sheet can be used, for example, as a tape material for shipping.

An adhesive layer is formed on a main surface of the carrier sheet 201. In the present preferred embodiment, an adhesive sheet 202 being commercially available and having adhesiveness on both surfaces is used as the adhesive layer. The adhesive sheet 202 also has stretchability in the surface direction. However, a method of forming the adhesive layer can be freely selected, and an adhesive may be used, instead of the adhesive sheet 202.

The plurality of multilayer capacitors 100 according to the first preferred embodiment described above are bonded to the adhesive sheet 202. The first main surface 1A of the capacitor body 1 of the multilayer capacitor 100 is bonded to the adhesive sheet 202. Although not seen in FIG. 6A, a plurality of multilayer capacitors 100 are arranged in rows and columns and bonded to the adhesive sheet 202 in a matrix.

In the present preferred embodiment, the plurality of multilayer capacitors 100 are bonded to the adhesive sheet 202 with a predetermined gap from each other. This is to prevent the multilayer capacitors 100 from coming into contact with each other and damaging the multilayer capacitors 100. However, instead of this, the plurality of multilayer capacitors 100 may be bonded to the adhesive sheet 202 with no gap therebetween.

The multilayer capacitor group 200 according to the present preferred embodiment has a simple structure, thus allowing the multilayer capacitor group 200 to be extremely easily manufactured. Moreover, both the carrier sheet 201 and the adhesive sheet 202 are inexpensive, thus allowing the multilayer capacitor group 200 to be manufactured at extremely low cost except for the cost of manufacturing the multilayer capacitors 100.

FIGS. 6B and 6C illustrate a method of removing the multilayer capacitors 100 from the multilayer capacitor group 200.

First, as illustrated in FIG. 6B, both the carrier sheet 201 and the adhesive sheet 202 are pulled and extended in a longitudinal direction and a lateral direction as indicated by arrows P. As a result, gaps between the plurality of multilayer capacitors 100 become large.

Subsequently, as illustrated in FIG. 6B, the adhesive sheet 202 appearing at the enlarged gaps between the plurality of multilayer capacitors 100 is partially eliminated by laser irradiation or the like as indicated by arrows L, for example, so that the adhesive sheet 202 is made to adhesive sheets 202a singulated for the respective multilayer capacitors 100.

Next, when the respective multilayer capacitors 100 are pulled in an upward direction from the carrier sheet 201 as illustrated in FIG. 6C, the respective multilayer capacitors 100 are removed from the carrier sheet 201 as illustrated by arrows D. The singulated adhesive sheet 202a attached to the first main surface 1A can be used for mounting (fixing) the multilayer capacitor 100.

In the multilayer capacitor group 200 of the present preferred embodiment, each of the carrier sheet 201 and the adhesive sheet 202 has stretchability in the surface direction, but a carrier sheet and/or an adhesive sheet not having stretchability may be used. In addition, instead of the adhesive sheet 202, an adhesive layer (a kind of an adhesive layer) having adhesiveness may be provided on the main surface of the carrier sheet 201. In the above description, when the multilayer capacitor 100 is removed from the carrier sheet 201, the adhesive sheet 202 remains at the multilayer capacitor 100 side (the first main surface 1A of the multilayer capacitor 100), but the adhesive sheet 202 and the adhesive layer may remain at the carrier sheet 201 side.

One Example of Method of Using Multilayer Capacitor

FIGS. 7A to 7C illustrate examples of a method of using the multilayer capacitor 100 according to the first preferred embodiment. FIGS. 7A to 7C are cross-sectional views (explanatory view) illustrating the example of the method of using the multilayer capacitor 100.

First, as illustrated in FIG. 7A, the multilayer capacitor 100 is completely embedded inside resin 150.

Next, as illustrated in FIG. 7B, a main surface of the resin 150 (the main surface at the second main surface 1B side of the embedded multilayer capacitor 100) is polished.

As a result, as illustrated in FIG. 7C, the top surfaces of the first external electrodes 5 and the second external electrodes 6 are exposed from the main surface of the resin 150.

In the multilayer capacitor 100, the height EH of the first external electrode 5 and the second external electrode 6 is sufficiently large with respect to the height MH of the capacitor body 1, and thus, the first via conductor 7 (not illustrated) and the second via conductor 8 (not illustrated) are not exposed to the outside in polishing.

Second Preferred Embodiment

FIG. 8 illustrates a multilayer capacitor 300 according to a second preferred embodiment of the present invention. FIG. 8 is a cross-sectional view of the multilayer capacitor 300.

The multilayer capacitor 300 according to the second preferred embodiment is obtained by modifying a portion of the configuration of the multilayer capacitor 100 according to the first preferred embodiment. Specifically, in the multilayer capacitor 100, each of the first external electrode 5 and the second external electrode 6 is a plated electrode formed by plating, but in the multilayer capacitor 300, this configuration is modified. To be more specific, in the multilayer capacitor 300, a first external electrode 35 includes a non-plated electrode 35a and a plated electrode 35b on the non-plated electrode 35a, and a second external electrode 36 includes a non-plated electrode 36a and a plated electrode 36b on the non-plated electrode 36a.

The non-plated electrodes 35a and 36a can be formed by, for example, applying a conductive paste on the conductive pastes 87 and 88 exposed from the main surface at an upper side of the unfired mother green sheet multilayer body 81 after filling the conductive pastes 87 and 88 into the through holes 77 and 78 of the unfired mother green sheet multilayer body 81 illustrated in FIG. 4D in the method for manufacturing the multilayer capacitor 100 according to the first preferred embodiment described above. That is, the conductive paste applied on the conductive pastes 87 and 88 is fired at the same time as the firing of the unfired green sheet multilayer body 91 as illustrated in FIG. 4F to form the non-plated electrodes 35a and 36a.

A main component of the non-plated electrodes 35a and 36a is freely selected, and for example, Ni can be used. However, another metal such as, for example, Cu, Ag, Pd, and Au may be used instead of Ni. Additionally, for example, Ni, Cu, Ag, Pd, Au, or the like may be an alloy with another metal (for example, an Ag—Pd alloy).

The plated electrodes 35b and 36b can be formed on the non-plated electrodes 35a and 36a by plating. The plated electrodes 35b and 36b may be made of a freely-selected material, and can be made of, for example, the same material as that of the first external electrode 5 and the second external electrode 6 of the multilayer capacitor 100 according to the first preferred embodiment.

In the multilayer capacitor 300 as well as the multilayer capacitor 100, the height EH of the first external electrode 35 and the second external electrode 36 is, for example, equal to or larger than about 50% of the height MH of the capacitor body 1. Thus, the first via conductors 7 and the second via conductors 8 are less likely to be exposed to the outside even when the multilayer capacitor 300 is embedded in resin and then the outer surface of the resin is polished to expose top surfaces of the first external electrodes 35 and the second external electrodes 36 to the outside or even when holes reaching the top surfaces of the first external electrodes 35 and the second external electrodes 36 from the outer surface of the resin are formed by, for example, laser beam irradiation or the like.

Third Preferred Embodiment

FIG. 9 illustrates a multilayer capacitor 400 according to a third preferred embodiment of the present invention. FIG. 9 is a cross-sectional view of the multilayer capacitor 400.

The multilayer capacitor 400 according to the third preferred embodiment is obtained by modifying a portion of the configuration of the multilayer capacitor 100 according to the first preferred embodiment. To be specific, in the multilayer capacitor 100, the first external electrodes 5 and the second external electrodes 6 are provided only on the second main surface 1B of the capacitor body 1, but in the multilayer capacitor 400, this configuration is modified. To be more specific, in the multilayer capacitor 400, the first external electrodes 5 and the second external electrodes 6 are provided on both of the first main surface 1A and the second main surface 1B of the capacitor body 1.

In the multilayer capacitor 400, both the height EH of the first external electrode 5 and the second external electrode 6 that are provided on the first main surface 1A of the capacitor body 1 and the height EH of the first external electrode 5 and the second external electrode 6 that are provided on the second main surface 1B of the capacitor body 1 are set to be, for example, equal to or larger than about 50% of the height MH of the capacitor body 1. Thus, all of the first external electrodes 5 and the second external electrodes 6 that are provided on the first main surface 1A of the capacitor body 1 and the first external electrodes 5 and the second external electrodes 6 that are provided on the second main surface 1B of the capacitor body 1 have sufficiently large heights.

The multilayer capacitor 400 can be used, for example, by being embedded in resin, polishing both main surfaces of the resin, and exposing the top surfaces of the first external electrodes 5 and the second external electrodes 6 from both the main surfaces of the resin.

Fourth Preferred Embodiment

FIG. 10 illustrates a multilayer capacitor 500 according to a fourth preferred embodiment of the present invention. FIG. 10 is a cross-sectional view of the multilayer capacitor 500.

The multilayer capacitor 500 according to the fourth preferred embodiment is obtained by modifying a portion of the configuration of the multilayer capacitor 100 according to the first preferred embodiment. Specifically, in the multilayer capacitor 100, the capacitor body 1 includes only the capacitance formation region CL in which the dielectric layers 2, the first internal electrodes 3, and the second internal electrodes 4 are laminated. This configuration is modified, and in the multilayer capacitor 500, the capacitor body 1 includes the capacitance formation region CL and a lower protection region PL1 at a lower side of the capacitance formation region CL.

The lower protection region PL1 is formed by laminating dielectric layers 52 and dummy electrodes 53. The lower protection region PL1 is added to improve the mechanical strength of the capacitor body 1. Thus, the dielectric layer 52 may be made of, for example, the same material as that of the dielectric layer 2 in the capacitance formation region CL, but is preferably made of a material having higher mechanical strength than that of the dielectric layer 2 in the capacitance formation region CL. The dummy electrodes 53 in the lower protection region PL1 also contribute to improving the mechanical strength of the capacitor body 1. However, the dummy electrodes 53 in the lower protection region PL1 are not necessary and can be omitted.

The lower protection region PL1 also covers and insulates the first via conductors 7 and the second via conductors 8 that are exposed from the main surface at the lower side of the capacitance formation region CL.

In the multilayer capacitor 500, the surface roughness of the first main surface 1A defining a mounting surface is also preferably larger than the surface roughness of the second main surface 1B. This is because when the first main surface 1A of the multilayer capacitor 500 is bonded to a substrate or the like, the bonding can be performed with a large adhesive force. In order to make the surface roughness of the first main surface 1A larger than that of the second main surface 1B, for example, when the material of the dielectric layer 2 in the capacitance formation region CL is different from the material of the dielectric layer 52 in the lower protection region PL1, the material of the dielectric layer 52 may have a larger surface roughness than that of the dielectric layer 2. Also, when the material of the dielectric layer 2 in the capacitance formation region CL is the same or substantially the same as the material of the dielectric layer 52 in the lower protection region PL1, the surface roughness of the first main surface 1A may be increased by sandblasting or barrel treatment, for example, thus making the surface roughness of the first main surface 1A larger than the surface roughness of the second main surface 1B.

Also in the multilayer capacitor 500, the height EH of the first external electrode 5 and the second external electrode 6 is set to be, for example, equal to or larger than about 50% of the height MH of the capacitor body 1, so that the height EH of the first external electrode 5 and the second external electrode 6 is set to be sufficiently large.

Fifth Preferred Embodiment

FIG. 11 illustrates a multilayer capacitor 600 according to a fifth preferred embodiment of the present invention. FIG. 11 is a cross-sectional view of the multilayer capacitor 600.

The multilayer capacitor 600 according to the fifth preferred embodiment is obtained by further modifying the multilayer capacitor 500 according to the fourth preferred embodiment. Specifically, in the multilayer capacitor 600, an upper protection region PL2 is included at an upper side of the capacitance formation region CL of the capacitor body 1 of the multilayer capacitor 500.

Similar to the lower protection region PL1, the upper protection region PL2 is formed by laminating the dielectric layers 52 and the dummy electrodes 53. However, through holes 53a are provided in the dummy electrodes 53 in the upper protection region PL2. The first via conductors 7 and the second via conductors 8 penetrate through the through holes 53a while being insulated from the dummy electrodes 53.

The upper protection region PL2 is also added to improve the mechanical strength of the capacitor body 1. The dummy electrodes 53 in the upper protection region PL2 are not necessary and can be omitted.

Also in the multilayer capacitor 600, the height EH of the first external electrode 5 and the second external electrode 6 is set to be, for example, equal to or larger than about 50% of the height MH of the capacitor body 1, and the height EH of the first external electrode 5 and the second external electrode 6 is set to be sufficiently large.

Sixth Preferred Embodiment

FIG. 12 illustrates a multilayer capacitor 700 according to a sixth preferred embodiment of the present invention. FIG. 12 is a cross-sectional view of the multilayer capacitor 700.

The multilayer capacitor 700 according to the sixth preferred embodiment is obtained by adding a configuration to the multilayer capacitor 100 according to the first preferred embodiment. To be specific, in the multilayer capacitor 700, a Sn film 3b is provided on an outer surface of the first internal electrode 3, and a Sn film 4b is provided on an outer surface of the second internal electrode 4. Also in the present preferred embodiment, Ni is used as the main component of each of the first internal electrode 3, the second internal electrode 4, the first via conductor 7, and the second via conductor 8. In the multilayer capacitor 700 according to the present preferred embodiment, when the Sn film 3b and the Sn film 4b are provided, a Sn film 7b is provided on an outer surface of the first via conductor 7, and a Sn film 8b is provided on an outer surface of the second via conductor 8 at the same time. However, the Sn film 7b and the Sn film 8b may be omitted.

The Sn film 3b may be provided on at least a portion of the outer surface of the first internal electrode 3. The Sn film 4b may be provided on at least a portion of the outer surface of the second internal electrode 4.

Sn has a higher interface barrier than that of Ni, and thus, reliability can be improved by providing a Sn film on the outer surface of an internal electrode including Ni as the main component, for example. For example, providing the Sn film on the outer surface of the internal electrode including Ni as the main component can make mean time to failure (MTTF) about 2 to 10 times larger. In addition, providing the Sn film on the outer surface of the internal electrode improves the coverage of the internal electrode, which can make the capacitance of the multilayer capacitor large.

A method of forming the Sn film 3b on the outer surface of the first internal electrode 3 and forming the Sn film 4b on the outer surface of the second internal electrode 4 is freely selected. For example, Sn may be added to the conductive paste for forming the first via conductor 7 and the second via conductor 8. When Sn is added to the conductive paste, by firing the unfired green sheet multilayer body to produce the capacitor body 1, Sn is precipitated on the outer surface, the Sn film 7b is formed on the outer surface of the first via conductor 7, and the Sn film 8b is formed on the outer surface of the second via conductor 8. Then, Sn diffuses into the first internal electrodes 3 connected to the first via conductor 7, and precipitates on the outer surfaces to form the Sn films 3b on the outer surfaces of the first internal electrodes 3. In addition, Sn diffuses into the second internal electrodes 4 connected to the second via conductor 8, and precipitates on the outer surfaces to form the Sn films 4b on the outer surfaces of the second internal electrodes 4.

The multilayer capacitor 700 has high reliability and large capacitance, because the Sn films 3b are provided on the outer surfaces of the first internal electrodes 3 and the Sn films 4b are provided on the outer surfaces of the second internal electrodes 4.

The multilayer capacitors 100, 300, 400, 500, 600, and 700 according to the first preferred embodiment to the sixth preferred embodiment and the multilayer capacitor group 200 according to the first preferred embodiment have been described above. However, the present invention is not limited to the preferred embodiments described above, and various modifications can be made within the scope of the present invention.

For example, in the multilayer capacitor 100 and the like, the plurality of first external electrodes 5 and the plurality of second external electrodes 6 are arranged in rows and columns in a matrix on the second main surface 1B of the capacitor body 1, and the first external electrodes 5 and the second external electrodes 6 are alternately arranged in both rows and columns. However, the first external electrodes 5 and the second external electrodes 6 are freely arranged. For example, only the first external electrodes 5 may be arranged in the first row, only the second external electrodes 6 may be arranged in the second row, and the rows of the first external electrodes 5 and the rows of the second external electrodes 6 may be alternately arranged.

A multilayer capacitor according to a preferred embodiment of the present invention is as described in the SUMMARY OF THE INVENTION.

In this multilayer capacitor, it is also preferable that the height of the first external electrode and the second external electrode is, for example, equal to or larger than about 60% of the height of the capacitor body. In this case, the height of the first external electrode 5 and the second external electrode 6 can be more sufficiently increased.

It is also preferable that the height of the first external electrode and the second external electrode is, for example, equal to or smaller than about 80% of the height of the capacitor body. This is because when the height of the first external electrode and the second external electrode exceeds about 80% of the height of the capacitor body, the strength of mechanical attachment of the first external electrode and the second external electrode to the capacitor body may become insufficient.

The height of the capacitor body is, for example, equal to or less than about 200 μm. Preferred embodiments of the present invention are particularly useful in such a thin-layered multilayer capacitor. The height of the capacitor body may be equal to or less than about 100 μm, or may be equal to or less than 50 μm, for example. Preferred embodiments of the present invention can also be applied to such an extremely thin-layered multilayer capacitor.

The height of the capacitor body is preferably, for example, equal to or larger than about 40 μm. This is because when the height of the capacitor body is less than about 40 μm, it is difficult to obtain a large capacitance.

Each of the first external electrode and the second external electrode may be, for example, a plated electrode formed only by plating. The plated electrode can be formed with high positional accuracy and with its height controlled with high accuracy as compared with a fired electrode or the like. Alternatively, each of the first external electrode and the second external electrode may include a non-plated electrode and a plated electrode on the non-plated electrode.

It is also preferable that, for example, the dielectric layer includes ceramic as a main component, each of the first internal electrode, the second internal electrode, the first via conductor, and the second via conductor includes Ni as a main component, and a volume of Ni included in the first internal electrodes, the second internal electrodes, the first via conductors, and the second via conductors with respect to the total volume of the capacitor body is equal to or larger than about 25.0 vol %. This is because the capacitor body has high mechanical strength in this case.

It is also preferable that, for example, a Sn film is provided on each of at least a portion of the outer surface of the first internal electrode and at least a portion of the outer surface of the second internal electrode. This is because the reliability of the multilayer capacitor is improved and the capacitance thereof is increased in this case.

The first external electrode and the second external electrode may be provided on both the first main surface and the second main surface. Alternatively, the first external electrode and the second external electrode may be provided on the second main surface, and do not need to be provided on the first main surface.

It is also preferable that the capacitor body include, in addition to the capacitance formation region in which the plurality of dielectric layers, the plurality of first internal electrodes, and the plurality of second internal electrodes are laminated, the lower protection region including the dielectric layers at the first main surface side of the capacitor body, and a dummy internal electrode electrically connected to neither the first via conductor nor the second via conductor be formed inside the lower protection region. In this case, the mechanical strength of the capacitor body can be improved.

It is also preferable that the capacitor body includes, in addition to the capacitance formation region in which the plurality of dielectric layers, the plurality of first internal electrodes, and the plurality of second internal electrodes are laminated, the upper protection region including the dielectric layers at the second main surface side of the capacitor body, and a dummy internal electrode electrically connected to neither the first via conductor nor the second via conductor be formed inside the upper protection region. In this case as well, the mechanical strength of the capacitor body can be improved.

It is also preferable that the capacitor body include, in addition to the capacitance formation region in which the plurality of dielectric layers, the plurality of first internal electrodes, and the plurality of second internal electrodes are laminated, the upper protection region including the dielectric layers at the first main surface side of the capacitor body, and both the first via conductor and the second via conductor penetrate the upper protection region. In this case as well, the mechanical strength of the capacitor body can be improved.

It is also preferable that a composition of the dielectric layers in the capacitance formation region is different from a composition of the dielectric layers in the lower protection region and/or the upper protection region. In this case, the composition of the dielectric layers in the lower protection region and/or the upper protection region can be higher in mechanical strength than the composition of the dielectric layers in the capacitance formation region.

It is also preferable that the surface roughness of the first main surface is different from the surface roughness of the second main surface, and the surface roughness of the first main surface is larger than the surface roughness of the second main surface. In this case, when the first main surface 1A of the multilayer capacitor is bonded to a substrate or the like, bonding can be performed with a large adhesive force.

It is also preferable that a singulated adhesive sheet is attached to the first main surface. In this case, the adhesive sheet can be used to mount (fix) the multilayer capacitor.

It is also preferable that a multilayer capacitor group includes a carrier sheet, an adhesive layer on one main surface of the carrier sheet, and a multilayer capacitor according to a preferred embodiment of the present invention, wherein a plurality of multilayer capacitors are held by the carrier sheet with the first main surface of each of the plurality of multilayer capacitors bonded to the adhesive layer. In this case, the multilayer capacitor group can be used for storage, transportation and the like of the multilayer capacitor.

In the multilayer capacitor group, it is also preferable that the carrier sheet has stretchability in the surface direction. In this case, the multilayer capacitor can be easily removed from the multilayer capacitor group.

It is also preferable that the adhesive layer is an adhesive sheet having adhesiveness on both surfaces and stretchability in the surface direction. In this case, the multilayer capacitor can be easily bonded to the adhesive layer. Additionally, in this case, it is easy to remove the multilayer capacitor from the multilayer capacitor group.

After cutting the adhesive sheet for each of the multilayer capacitors, when the multilayer capacitor is to be peeled off from the carrier sheet, the multilayer capacitor is peeled off from the carrier sheet with the individually cut adhesive sheet adhering at the multilayer capacitor side. In this case, the individually cut adhesive sheet can be used to mount (fix) the multilayer capacitor.

It is also preferable that the plurality of multilayer capacitors held by the carrier sheet with the first main surfaces bonded to the adhesive layer is held by the carrier sheet at intervals from each other. In this case, it is possible to prevent the plurality of multilayer capacitors from coming into contact with each other on the carrier sheet and damaging the multilayer capacitors.

A multilayer capacitor group according to a preferred embodiment of the present invention is not limited to the multilayer capacitors, and can also be used for storing and transporting other types of electronic components. The inventor of preferred embodiments of the present invention has also invented a technical idea of an electronic component group including a carrier sheet, an adhesive layer on one main surface of the carrier sheet, and a plurality of electronic components, the plurality of electronic components are held by the carrier sheet with a first main surface (a main surface on which an external electrode is not formed) being adhered to the adhesive layer. In this electronic component group, it is also preferable that the carrier sheet have stretchability in a surface direction. In this case, it is easy to remove the electronic component from the electronic component group. It is also preferable that the adhesive layer has adhesiveness on both surfaces. In this case, the electronic components can be easily bonded to the adhesive layer. It is also preferable that the adhesive sheet have stretchability in the surface direction. In this case, it is easy to remove the electronic component from the electronic component group. In addition, after cutting the adhesive sheet for each of the electronic components, when the electronic components are to be peeled off from the carrier sheet, it is also preferable that the electronic components are peeled off from the carrier sheet with the individually cut adhesive sheet adhering at the electronic component side. In this case, the individually cut adhesive sheet can be used to mount (fix) the electronic component. It is also preferable that the first main surface is adhered to the adhesive layer and the plurality of electronic components held by the carrier sheet are held by the carrier sheet at intervals from each other. In this case, it is possible to prevent the plurality of electronic components from coming into contact with each other on the carrier sheet and damaging the electronic components. A type of electronic components is freely selected, and various electronic components such as, for example, capacitors, inductors, resistors, and LC composite components can be configured as the electronic component group.

A method for manufacturing a multilayer capacitor according to a preferred embodiment of the present invention is as described in the SUMMARY OF THE INVENTION.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer capacitor comprising:
a capacitor body including a plurality of dielectric layers that are laminated, a plurality of first internal electrodes, and a plurality of second internal electrodes, the capacitor body including a first main surface and a second main surface opposed to each other;
a plurality of first external electrodes and a plurality of second external electrodes on at least one of the first main surface and the second main surface;
a plurality of first via conductors to electrically connect the first external electrode and the plurality of first internal electrodes; and
a plurality of second via conductors to electrically connect the second external electrode and the plurality of second internal electrodes; wherein the second internal electrode includes a through hole, and the first via conductor is insulated from the second internal electrode, the first via conductor penetrates through the through hole;

the first internal electrode includes a through hole, and the second via conductor is insulated from the first internal electrode, the second via conductor penetrates through the through hole; and a direction in which the dielectric layer, the first internal electrode, and the second internal electrode are laminated is defined as a height direction of the capacitor body, and the height of the capacitor body is set to 100%;

each of heights of the first external electrode and the second external electrode is equal to or larger than about 50% with respect to the height of the capacitor body;

each of the plurality of first external electrodes and the plurality of second external electrodes includes a plated electrode portion that is directly connected to a portion of the corresponding plurality of first via conductors or plurality of second via conductors;

the portion of the corresponding plurality of first via conductors or plurality of second via conductors is made of a conductive paste; and when viewed at the direct connection of the plurality of first and second external electrodes and the plurality of first and second via conductors in the height direction, a surface area of at least one of the plurality of first external electrodes and the plurality of second external electrodes is equal or substantially equal to a surface area of the corresponding plurality of first via conductors or plurality of second via conductors.

2. The multilayer capacitor according to claim 1, wherein the height of the capacitor body is equal to or less than about 200 μm.

3. The multilayer capacitor according to claim 1, wherein each of the first external electrode and the second external electrode includes a plated-only electrode.

4. The multilayer capacitor according to claim 1, wherein
the plurality of dielectric layers include ceramic as a main component;
each of the first internal electrode, the second internal electrode, the first via conductor, and the second via conductor includes Ni as a main component; and
with respect to a total volume of the capacitor body, a volume of Ni included in the first internal electrode, the second internal electrode, the first via conductor, and the second via conductor is equal to or larger than about 25.0 vol %.

5. The multilayer capacitor according to claim 1, wherein a Sn film is on each of at least a portion of an outer surface of the first internal electrode and at least a portion of an outer surface of the second internal electrode.

6. The multilayer capacitor according to claim 1, wherein the first external electrode and the second external electrode are on both of the first main surface and the second main surface.

7. The multilayer capacitor according to claim 1, wherein the first external electrode and the second external electrode are on the second main surface, and are not on the first main surface.

8. The multilayer capacitor according to claim 1, wherein the capacitor body includes:

a capacitance formation region in which the plurality of dielectric layers, the plurality of first internal electrodes, and the plurality of second internal electrodes are laminated;

a lower protection region including a dielectric layer of the plurality of dielectric layers at a side of the first main surface of the capacitor body; and a dummy internal electrode is inside the lower protection region, the dummy internal electrode being electrically connected to neither the first via conductor nor the second via conductor.

9. The multilayer capacitor according to claim 1, wherein the capacitor body includes:

a capacitance formation region in which the plurality of dielectric layers, the plurality of first internal electrodes, and the plurality of second internal electrodes are laminated;

an upper protection region including a dielectric layer of the plurality of dielectric layers at a side of the second main surface of the capacitor body; and a dummy internal electrode inside the upper protection region, the dummy internal electrode being electrically connected to neither the first via conductor nor the second via conductor.

10. The multilayer capacitor according to claim 1, wherein the capacitor body includes:

a capacitance formation region in which the plurality of dielectric layers, the plurality of first internal electrodes, and the plurality of second internal electrodes are laminated;

an upper protection region including a dielectric layer of the plurality of dielectric layers at a side of the second main surface of the capacitor body; and both the first via conductor and the second via conductor penetrate through the upper protection region.

11. The multilayer capacitor according to claim 8, wherein a composition of the plurality of dielectric layers in the capacitance formation region is different from a composition of the dielectric layer in the lower protection region.

12. The multilayer capacitor according to claim 1, wherein a surface roughness of the first main surface is larger than a surface roughness of the second main surface.

13. The multilayer capacitor according to claim 1, wherein a singulated adhesive sheet is attached to the first main surface.

14. A multilayer capacitor group comprising:

a carrier sheet;

an adhesive layer on one main surface of the carrier sheet; and a plurality of the multilayer capacitors according to claim 1; wherein the plurality of multilayer capacitors are held by the carrier sheet with the first main surface being adhered to the adhesive layer.

15. The multilayer capacitor group according to claim 14, wherein the carrier sheet has stretchability in a surface direction.

16. The multilayer capacitor group according to claim 14, wherein the adhesive layer is an adhesive sheet having adhesiveness on both surfaces and having stretchability in a surface direction.

17. The multilayer capacitor group according to claim 16, wherein, after cutting the adhesive sheet for each of the plurality of multilayer capacitors, when each of the plurality of multilayer capacitors is to be peeled off from the carrier sheet, each of the plurality of multilayer capacitors is peeled off from the carrier sheet with the individually cut adhesive sheet adhering at a side of each of the plurality of multilayer capacitors.

18. The multilayer capacitor group according to claim 14, wherein the plurality of multilayer capacitors held by the carrier sheet with the first main surfaces bonded to the adhesive layer are held by the carrier sheet at intervals from each other.

19. A method for manufacturing a multilayer capacitor, the method comprising:

preparing a base;

forming a conductive layer on an outer surface of the base;

preparing a plurality of unfired green sheet multilayer bodies in which a first main surface and a second main surface that are opposed to each other are provided, a conductive paste pattern that forms a first internal electrode and a conductive paste pattern that forms a second internal electrode are formed at an interlayer, a through hole penetrating through the first main surface and the second main surface is filled with a conductive paste that forms a first via conductor, and another through hole penetrating through between the first main surface and the second main surface is filled with a conductive paste that forms a second via conductor;

attaching the first main surface of the plurality of unfired green sheet multilayer bodies to the conductive layer of the base;

producing a plurality of capacitor bodies in which the plurality of unfired green sheet multilayer bodies are formed in a state where the plurality of unfired green sheet multilayer bodies are attached to the conductive layer of the base, and the first internal electrode and the second internal electrode are formed at the interlayer, and the first via conductor electrically connected to the first internal electrode, and the second via conductor electrically connected to the second internal electrode are formed to penetrate through the first main surface and the second main surface;

applying a current into the conductive layer and applying electrolytic plating to the first via conductor and the second via conductor that are exposed from the second main surface of the capacitor body; and forming a first external electrode electrically connected to the first via conductor and a second external electrode electrically connected to the second via conductor, the first external electrode and the second external electrode having heights equal to or larger than about 50% with respect to a height of the capacitor body when the height of the capacitor is set to 100%.

* * * * *